(12) United States Patent
Wen et al.

(10) Patent No.: US 11,792,629 B2
(45) Date of Patent: Oct. 17, 2023

(54) ELECTRONIC DEVICE, CONTROL TERMINAL, NON-TRANSITORY COMPUTER-READABLE STORAGE MEDIUM AND DEVICE CONNECTION METHOD

(71) Applicant: BOE Technology Group Co., Ltd., Beijing (CN)

(72) Inventors: Ken Wen, Beijing (CN); Xun Yang, Beijing (CN); Deli Fang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 50 days.

(21) Appl. No.: 17/297,471

(22) PCT Filed: Aug. 18, 2020

(86) PCT No.: PCT/CN2020/109708
§ 371 (c)(1),
(2) Date: May 27, 2021

(87) PCT Pub. No.: WO2021/032076
PCT Pub. Date: Feb. 25, 2021

(65) Prior Publication Data
US 2022/0038877 A1    Feb. 3, 2022

(30) Foreign Application Priority Data

Aug. 22, 2019    (CN) .......................... 201910779783.0

(51) Int. Cl.
*H04W 4/80*    (2018.01)
*H04W 4/06*    (2009.01)

(52) U.S. Cl.
CPC ............... *H04W 4/80* (2018.02); *H04W 4/06* (2013.01)

(58) Field of Classification Search
CPC .................................. H04W 4/80; H04W 4/06
(Continued)

(56) References Cited

U.S. PATENT DOCUMENTS 11,165,866 B2 * 11/2021 Kandan .................. H04L 67/12
2016/0344740 A1 * 11/2016 Choi ..................... H04L 63/107
(Continued)

FOREIGN PATENT DOCUMENTS

| CN | 204143522 U | 2/2015 |
| CN | 104735607 A | 6/2015 |

(Continued)

OTHER PUBLICATIONS

International Search Report for PCT/CN2020/109708 dated Nov. 9, 2020.
(Continued)

*Primary Examiner* — April G Gonzales
(74) *Attorney, Agent, or Firm* — Ling Wu; Stephen Yang; Ling and Yang Intellectual Property

(57) ABSTRACT

An electronic device, a control terminal, a non-transitory computer-readable storage medium, and a device connection method are provided. The electronic device includes: a device body and first Bluetooth equipment; the device body is configured to display information to be scanned, said information including identification information of the electronic device, the identification information including a media access control address; the first Bluetooth equipment is configured to send a broadcast signal outwards, the broadcast signal including: a name and content, the name including the identification information of the electronic device, and the content including the media access control address of the first Bluetooth equipment; and the first Bluetooth equipment is further configured to establish, in response to the information to be scanned being scanned by (Continued)

the control terminal, communication connection with the control terminal.

17 Claims, 3 Drawing Sheets

(58) Field of Classification Search
USPC ......................................................... 455/41.2
See application file for complete search history.

(56) References Cited

U.S. PATENT DOCUMENTS

2016/0358459 A1* 12/2016 Singhar ................... H04W 4/50
2018/0324735 A1* 11/2018 Zhang .................. H04W 12/50
2019/0357043 A1* 11/2019 Hu ........................ H04L 9/0643

FOREIGN PATENT DOCUMENTS

| CN | 105282234 A | 1/2016 |
|---|---|---|
| CN | 105427559 A | 3/2016 |
| CN | 105611488 A | 5/2016 |
| CN | 106603807 A | 4/2017 |
| CN | 107172571 A | 9/2017 |
| CN | 107566229 A | 1/2018 |
| EP | 3281425 A1 | 2/2018 |
| WO | 2016163104 A1 | 10/2016 |

OTHER PUBLICATIONS

Office Action dated Jul. 2, 2021 for Chinese Patent Application No. 201910779783.0 and English Translation.

* cited by examiner

ELECTRONIC DEVICE, CONTROL TERMINAL, NON-TRANSITORY COMPUTER-READABLE STORAGE MEDIUM AND DEVICE CONNECTION METHOD

CROSS-REFERENCE TO RELATED APPLICATIONS

The present application is a U.S. National Phase Entry of International PCT Application No. PCT/CN2020/109708, which claims priority of Chinese Patent Application No. 201910779783.0 filed with the CNIPA on Aug. 22, 2019. The present application claims priority and the benefit of the above-identified applications, and the above-identified applications are incorporated by reference herein in their entirety.

TECHNICAL FIELD

The present disclosure relates to, but is not limited to, the technical field of communication, in particular to an electronic device, a control terminal, a non-transitory computer-readable storage medium and a device connection method.

BACKGROUND

With the development of the Internet of Things, electronic devices such as electronic photo frames or televisions have been widely used in people's daily lives. An electronic device can establish a communication connection with a mobile electronic device such as a mobile phone through a wireless network, so that the operation of the electronic device can be controlled through the mobile electronic device, which is simple and convenient in operation.

When the electronic device is not connected with the wireless network, the electronic device cannot establish a communication connection with the mobile phone, and consequently the electronic device cannot be controlled through the mobile phone. When the electronic device is started to be used, it is not connected with the wireless network, at this time, boot guide setting and network connection setting can only be achieved by inputting instructions to the electronic device through a remote controller matched with the electronic device, which complicates the operation and brings inconvenience to the user.

SUMMARY

The following is a summary of the subject matter described in detail in the present disclosure. This summary is not intended to limit the protection scope of the claims.

In a first aspect, the present disclosure provides an electronic device, which includes a device body and a first Bluetooth equipment, wherein the device body is connected to the first Bluetooth equipment;

the device body is configured to display information to be scanned, which includes identification information of the electronic device, and the identification information includes a media access control address;

the first Bluetooth equipment is configured to send out a broadcast signal which includes a name and contents; the name of the broadcast signal includes the identification information of the electronic device, and the contents of the broadcast signal include the media access control address of the first Bluetooth equipment. The first Bluetooth equipment is further configured to establish a communication connection with the control terminal in response to that the information to be scanned is scanned by the control terminal.

In some possible implementations, the first Bluetooth equipment is further configured to receive data sent from the second Bluetooth equipment of the control terminal, and the device body is further configured to control the operation state of the electronic device according to the data received from the second Bluetooth equipment of the control terminal.

In some possible implementations, the electronic device further includes a modulation interface;

wherein the modulation interface is respectively connected to the first Bluetooth equipment and the device body, and is configured to transmit data received by the first Bluetooth equipment to the device body.

In some possible implementations, the operation state includes at least one of a booting configuration, a networking configuration and a display state;

wherein the display state includes at least one of menu, interface switching, volume adjustment, confirmation, booting or power-off, and standby.

In some possible implementations, the identification information further includes a product model, which is configured to indicate whether the electronic device has Bluetooth communication function.

In a second aspect, the present disclosure further provides a control terminal, which includes a processor and a second Bluetooth equipment;

the processor is configured to acquire identification information of electronic device, and the identification information includes a media access control address;

the second Bluetooth equipment is configured to determine a connection state with the electronic device according to the identification information.

In some possible implementations, the processor is configured to scan the information to be scanned displayed by the electronic device, analyze the information to be scanned, and obtain the identification information of the electronic device.

In some possible implementations, the second Bluetooth equipment is configured to: inquire about broadcast signals around the control terminal to obtain a list of devices meeting short-distance communication conditions, determine whether the electronic device is included in the list of devices according to the media access control address, and establish a communication connection with the electronic device when the electronic device is included in the list of devices.

In some possible implementations, the identification information further includes product model.

The second Bluetooth equipment is further configured to determine whether the electronic device has Bluetooth communication function according to the product model. When the electronic device has Bluetooth communication function, the broadcast signals around the control terminal are inquired to obtain a list of devices meeting the short-distance communication conditions.

In some possible implementations, the second Bluetooth equipment is further configured to transmit booting configuration information and networking configuration information input by the user to the first Bluetooth equipment of the electronic device in response to establishing the communication connection with the electronic device, so as to perform booting configuration and networking configuration on the electronic device.

In some possible implementations, the second Bluetooth equipment is further configured to transmit instruction information input by a user to the first Bluetooth equipment of the electronic device in response to establishing the communication connection with the electronic device, so as to control the electronic device.

The instruction information includes at least one of a menu instruction, an interface switching instruction, a volume adjustment instruction, a confirmation instruction, a booting or power-off instruction and a standby instruction.

In a third aspect, the present disclosure further provides a device connection method, which is applied to the above electronic device, the method including:

displaying information to be scanned, which includes identification information of the electronic device, and the identification information includes a media access control address;

sending out a broadcast signal, establishing a communication connection with the control terminal in response to that the information to be scanned is scanned by the control terminal; wherein the broadcast signal includes a name and contents; the name of the broadcast signal includes the identification information of the electronic device, and the contents of the broadcast signal include the media access control address of the first Bluetooth equipment.

In some possible implementations, the method further includes:

receiving data sent from the second Bluetooth equipment of the control terminal, and controlling the operation state of the electronic device according to the data received from the second Bluetooth equipment of the control terminal;

wherein the operation state includes at least one of a booting configuration, a networking configuration and a display state; wherein, the display state includes at least one of menu, interface switching, volume adjustment, confirmation, booting or power-off, and standby.

In a fourth aspect, the present disclosure further provides a device connection method, which is applied to the above control terminal, the method including:

acquiring identification information of the electronic device, and the identification information includes a media access control address;

determining a connection state with the electronic device according to the identification information.

In some possible implementations, obtaining the identification information of the electronic device includes: scanning the information to be scanned displayed by the electronic device, analyzing the information to be scanned, and obtaining the identification information of the electronic device;

determining a connection state with the electronic device according to the identification includes: inquiring about broadcast signals around the control terminal to obtain a list of devices meeting short-distance communication conditions, determining whether the electronic device is in the list of devices according to the media access control address, and establishing a communication connection with the electronic device when the electronic device is in the list of devices.

In some possible implementations, the identification information includes product model;

wherein determining a connection state with the electronic device according to the identification further includes: determining whether the electronic device has Bluetooth communication function according to the product model; when the electronic device has Bluetooth communication function, inquiring about the broadcast signals around the control terminal to obtain a list of devices meeting the short-distance communication conditions.

In some possible implementations, the method further includes:

transmitting booting configuration information and networking configuration information input by the user to the first Bluetooth equipment of the electronic device in response to establishing a communication connection with the electronic device, so as to perform booting configuration and networking configuration on the electronic device.

In some possible implementations, the method further includes:

transmitting instruction information input by a user to the first Bluetooth equipment of the electronic device in response to establishing a communication connection with the electronic device, so as to control the electronic device.

The instruction information includes at least one of a menu instruction, an interface switching instruction, a volume adjustment instruction, a confirmation instruction, a booting or power-off instruction and a standby instruction.

In a fifth aspect, the present disclosure further provides a non-transitory computer-readable storage medium on which a computer program executable on a processor is stored, and when the computer program is executed by the processor, the steps of the above-mentioned device connection method can be implemented.

In a sixth aspect, the present disclosure further provides an electronic device, which includes a processor and a memory, wherein the memory stores a computer program, and when the computer program is executed by the processor, the steps of the device connection method are implemented.

Other aspects will become apparent upon reading and understanding accompanying drawings and the detailed description.

BRIEF DESCRIPTION OF DRAWINGS

Accompanying drawings are used to provide an understanding of technical solutions of the present disclosure and form a part of the specification. Together with embodiments of the present disclosure, they are used to explain technical solutions of the present disclosure and do not constitute a limitation on the technical solutions of the present disclosure.

DETAILED DESCRIPTION

Figure 1:
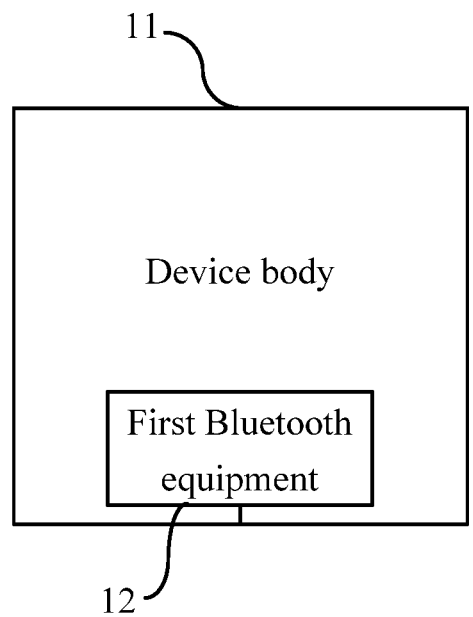
FIG. 1 is a schematic diagram of a structure of an electronic device according to an embodiment of the present disclosure.

Hereinafter embodiments of the present disclosure will be described in detail with reference to the accompanying drawings. The embodiments and features in the embodiments in the present disclosure may be combined arbitrarily if there is no conflict.

Multiple embodiments are described in the present disclosure, but the description is exemplary rather than limiting, and for those of ordinary skills in the art, there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

The present disclosure includes and contemplates combinations of features and elements known to those of ordinary skilled in the art. The disclosed embodiments, features and elements of the present disclosure may be combined with any common features or elements to form a technical solution defined by the claims. Any feature or element of any embodiment may also be combined with features or elements from other technical solutions to form another technical solution defined by the claims. Therefore, it should be understood that any of the features shown and/or discussed in the present disclosure may be implemented individually or in any suitable combination. Therefore, the embodiments are not otherwise limited except in accordance with the appended claims and equivalents thereof. In addition, various modifications and changes can be made within the protection scope of the appended claims.

Unless otherwise defined, technical terms or scientific terms used in the present disclosure shall have ordinary meanings understood by those of ordinary skills in the art to which the present disclosure pertains. The words "first", "second" and the like used in the present disclosure do not indicate any order, quantity or importance, but are only used to distinguish different components. Similar words such as "including" or "containing" mean that elements or articles appearing before the word cover elements or articles listed after the word and their equivalents, without excluding other elements or articles. Similar words such as "connect" or "link" are not limited to physical or mechanical connections, but may include electrical connections, whether direct or indirect.

FIG. 1 is a schematic diagram of a structure of an electronic device according to an embodiment of the present disclosure. As shown in FIG. 1, an electronic device according to an embodiment of the present disclosure includes a device body 11 and a first Bluetooth equipment 12. The device body 11 is connected with the first Bluetooth equipment 12.

The device body 11 is configured to display information to be scanned, and the first Bluetooth equipment 12 is configured to send out a broadcast signal, and is further configured to establish a communication connection with a control terminal in response to that the information to be scanned is scanned by the control terminal.

In an exemplary embodiment, the electronic device may include an electronic photo frame, or a television.

In an exemplary embodiment, the information to be scanned may include identification information of the electronic device. The identification information may include a media access control address. The identification information of the electronic device uniquely corresponds to the electronic device, that is, the unique electronic device can be known according to the identification information of the electronic device.

In an exemplary embodiment, the broadcast signal includes a name and contents. The name of the broadcast signal includes the identification information of the electronic device, and the contents of the broadcast signal include the media access control address of the first Bluetooth equipment. Using the identification information of electronic device as the name of broadcast signal can ensure the uniqueness of the name of broadcast signal. For example, the first Bluetooth equipment 12 is configured to send out a broadcast signal including: 18bb26964138 18:bb:26:ab:6b:dc, where 18bb26964138 is the media access control address of the electronic device and 18:bb:26:ab:6b:dc is the media access control address of the first Bluetooth equipment.

The identification information of the electronic device is used, when the electronic device and the control terminal establish a communication connection, and the media access control address of the first Bluetooth equipment may be not used. By setting the name of the broadcast signal to be the media access control address of the electronic device, the control terminal can search and establish connection with the electronic device, which was to be connected, according to the name of the broadcast signal only, which is simple and convenient.

In an exemplary embodiment, in addition to the identification information of the electronic device, the media access control address of the first Bluetooth equipment may also be used when the electronic device and the control terminal establish the communication connection.

In an exemplary embodiment, the first Bluetooth equipment may be of any type that can send out broadcast signals.

In an exemplary embodiment, the first Bluetooth equipment may be a low-power single-mode first Bluetooth equipment. Using the low-power single-mode first Bluetooth equipment can reduce the power consumption, wherein the low-power single-mode first Bluetooth equipment uses the generic attribute profile protocol to communicate.

In an exemplary embodiment, the electronic device can turn on the first Bluetooth equipment when starting up, so that the first Bluetooth equipment starts to send out broadcast signals.

The first Bluetooth equipment included in the electronic device enables the electronic device to be searched for connection by the control terminal as a Bluetooth host, that is to say, the first Bluetooth equipment in the electronic device can enable the electronic device to establish communication connection with the control terminal, so that the electronic device can be controlled by the control terminal, simplifying the booting and networking operations of the electronic device, making it convenient for users.

In an exemplary embodiment, the first Bluetooth equipment in the electronic device can make the electronic device searchable by multiple control terminals, so that the electronic device can be controlled by multiple control terminals.

The electronic device according to the embodiment of the disclosure includes a device body and a first Bluetooth equipment, wherein the device body is connected to the first Bluetooth equipment; the device body is configured to display information to be scanned, which includes identification information of the electronic device, and the identification information includes a media access control address. The first Bluetooth equipment is configured to send out a broadcast signal which includes a name and contents; the name of the broadcast signal includes the identification information of the electronic device, and the contents of the broadcast signal include the media access control address of the first Bluetooth equipment. The first Bluetooth equipment is further configured to establish a communication connection with the control terminal in response to that the information to be scanned is scanned by the control terminal. The electronic device according to the present disclosure establishes a communication connection with the control terminal based on the Bluetooth communication mode, which can simplify the booting and networking operations of the electronic device, and is convenient for the users.

In an exemplary embodiment, the first Bluetooth equipment 12 is further configured to receive data sent from a second Bluetooth equipment of the control terminal, and the device body 11 is further configured to control the operation state of the electronic device according to the data received from the second Bluetooth equipment of the control terminal.

In an exemplary embodiment, the operation state includes at least one of a booting configuration, a networking configuration, and a display state.

In an exemplary embodiment, the display state includes at least one of menu, interface switching, volume adjustment, confirmation, booting or power-off, and standby.

In response to the communication connection between the electronic device and the control terminal, the electronic device controls its own operation state according to the data sent by the control terminal, which can avoid inputting instructions to the electronic device through the matched remote controller when the wireless network is not connected, thereby simplifying the operation and bringing convenience to users.

Figure 2:
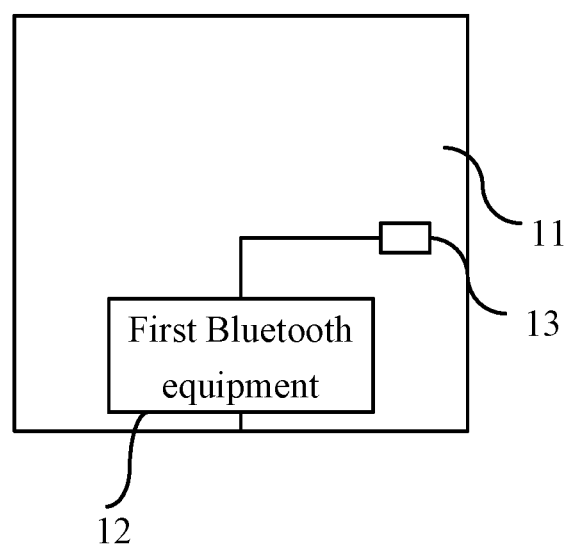
FIG. 2 is a schematic diagram of a structure of an electronic device according to an exemplary embodiment.

FIG. 2 is a schematic diagram of a structure of an electronic device according to an exemplary embodiment. As shown in FIG. 2, the electronic device according to an exemplary embodiment further includes a modulation interface 13.

The modulation interface 13 is respectively connected to a first Bluetooth equipment 12 and a device body 11, and the modulation interface 13 is configured to transmit data received by the first Bluetooth equipment 12 to the device body 11.

In an exemplary embodiment, the modulation interface 13 may be a modulation interface of a processor of an electronic device.

After the electronic device stands by, although the process of the application layer of the electronic device is terminated, the modulation interface of the processor of the electronic device is still valid. Since the modulation interface can still receive data information when the electronic device is in a standby state, the first Bluetooth equipment is connected to the device body through the modulation interface, so that the electronic device can still receive data signals sent by the second Bluetooth equipment of the control terminal when the electronic device is in standby state, that is, the control terminal can still control the electronic device even when the electronic device is in standby state.

In an exemplary embodiment, the identification information of the electronic device further includes a product model. Herein, the product model is configured to indicate whether the electronic device has Bluetooth communication function.

In an exemplary embodiment, the identification information includes product model, and whether the electronic device has the Bluetooth communication function can be indicated through the product model, avoiding the misoperation of establishing a communication connection with the control terminal when the electronic device does not have the Bluetooth communication function, which can reduce the power consumption of the electronic device.

Figure 3:
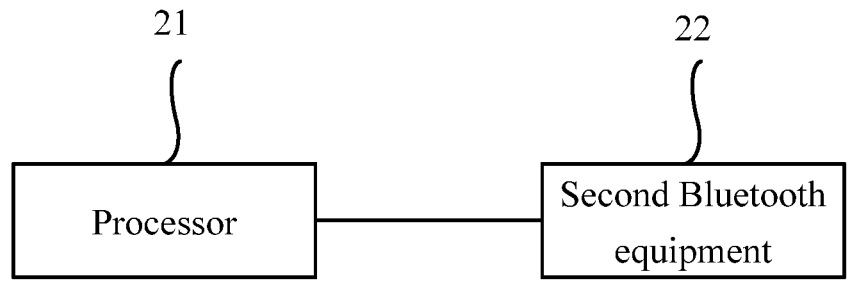
FIG. 3 is a schematic diagram of a structure of a control terminal according to an embodiment of the present disclosure.

Embodiments of the present disclosure further provide a control terminal. FIG. 3 is a schematic diagram of a structure of a control terminal according to an embodiment of the present disclosure. As shown in FIG. 3, the control terminal according to the embodiment of the present disclosure includes a processor 21 and a second Bluetooth equipment 22.

The processor 21 is configured to acquire identification information of the electronic device. The second Bluetooth equipment 22 is configured to determine a connection state with the electronic device according to the identification information.

In an exemplary embodiment, the identification information includes a media access control address.

In an exemplary embodiment, the control terminal may include a mobile phone, a laptop computer or a tablet computer.

In an exemplary embodiment, the connection state includes: communication connection with electronic device is being established and communication connection with electronic device cannot be established.

The control terminal according to the embodiment of the disclosure includes a processor and a second Bluetooth equipment, wherein, the processor is configured to acquire identification information of the electronic device, and the identification information includes a media access control address; and the second Bluetooth equipment is configured to determine the connection state with the electronic device according to the identification information. The control terminal according to the embodiment of the disclosure determines the connection state with the electronic device based on the Bluetooth communication mode, and in the connected state, the booting and networking operations of the electronic device can be simplified, bringing convenience to users.

In an exemplary embodiment, the processor 21 is configured to scan the information to be scanned displayed by the electronic device, analyze the information to be scanned, and obtain the identification information of the electronic device.

In an exemplary embodiment, the information to be scanned is configured to be displayed on the screen of the electronic device after the electronic device is turned on. Wherein, the information to be scanned can be in the form of a two-dimensional code or other forms.

In an exemplary embodiment, the processor 21 may be an application program. The control terminal downloads an application program configured to achieve the control of electronic device by the control terminal, and scans the information to be scanned through the application program. The application program is bound to an application program server through the identification information of the control terminal, and the application program server can send push notifications to the control terminal.

In an exemplary embodiment, the way to obtain the identification information of electronic device is relatively simple, which can simplify the operation steps of the device connection method.

In an exemplary embodiment, the second Bluetooth equipment 22 is configured to: inquire about broadcast signals around the control terminal to obtain a list of devices meeting short-distance communication conditions, determine whether the electronic device is included in the list of devices according to the media access control address, and establish a communication connection with the electronic device when the electronic device is included in the list of devices.

In an exemplary embodiment, the short-distance communication condition may be that the communication distance with the control terminal is less than a threshold distance, wherein the threshold distance is less than or equal to 15 m.

The mode of establishing communication connection between the control terminal and the electronic device enables the control terminal to be accurately connected to the electronic device with the same identification information obtained by the control terminal, thus avoiding misoperation between the control terminal and other device.

In an exemplary embodiment, the identification information may further include a product model. At this time, the second Bluetooth equipment 22 is further configured to determine whether the electronic device has Bluetooth communication function according to the product model. When the electronic device has Bluetooth communication function, the broadcast signals around the control terminal are inquired to obtain a list of devices meeting the short-distance communication conditions.

The identification information includes product model. Whether the electronic device has the Bluetooth communication function can be determined through the product model, avoiding the misoperation of establishing a communication connection with the electronic device when the electronic device does not have the Bluetooth communication function, which can reduce the power consumption.

In an exemplary embodiment, taking as an example that the identification information includes the product model and the media access control address, the second Bluetooth equipment is configured to: determine whether the electronic device has Bluetooth communication function according to the product model; when the electronic device has a Bluetooth communication function, inquire about broadcast signals around the control terminal to obtain a list of devices meeting the short-distance communication conditions; and when the electronic device does not have a Bluetooth communication function, does not establish a communication connection with the electronic device; determine whether the electronic device is included in the list of devices according to the media access control address; when the electronic device is in the list of devices, establish a communication connection with the electronic device, and when the electronic device is not in the list of devices, does not establish a communication connection with the electronic device.

In an exemplary embodiment, the second Bluetooth equipment 22 is further configured to transmit booting configuration information and networking configuration information input by the user to the first Bluetooth equipment of the electronic device in response to establishing the communication connection with the electronic device, so as to perform booting configuration and networking configuration on the electronic device.

In an exemplary embodiment, the second Bluetooth equipment 22 is further configured to transmit instruction information input by a user to the first Bluetooth equipment of the electronic device in response to establishing the communication connection with the electronic device, so as to control the electronic device.

In an exemplary embodiment, the instruction information may include at least one of a menu instruction, an interface switching instruction, a volume adjustment instruction, a confirmation instruction, a booting or a power-off instruction and a standby instruction.

Instruction information refers to the instruction that can be achieved by a remote controller corresponding to the electronic device, that is, the control terminal can achieve the functions of the remote controller corresponding to the electronic device.

The control terminal and the electronic device can transmit the data input by the user according to a predefined instruction protocol, so as to achieve the control of the electronic device by the control terminal. Herein, the control terminal sends the data input by the user to the first Bluetooth equipment of the electronic device according to a predefined instruction protocol, so that the first Bluetooth equipment receives the data and then transmits to an application layer of the electronic device, and the application layer of the electronic device analyzes and executes the corresponding instruction after receiving the data information.

Figure 4:
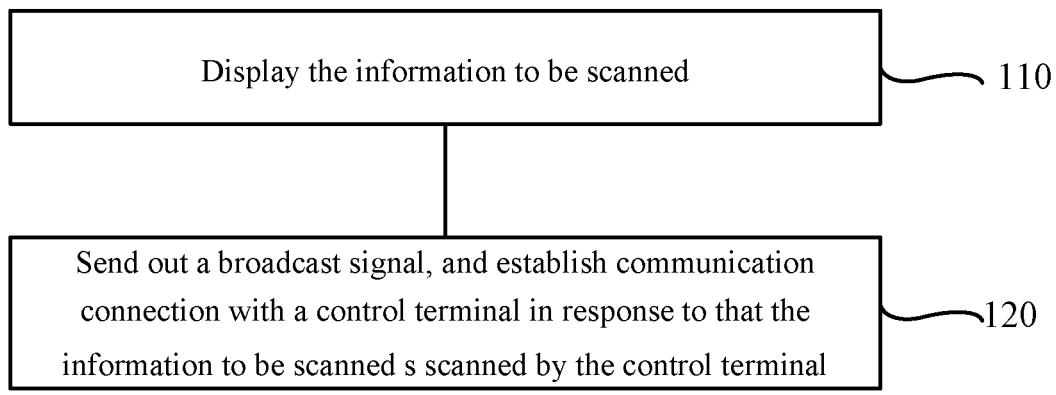
FIG. 4 is a flowchart of a device connection method applied to the electronic device according to an embodiment of the present disclosure.

The embodiment of the disclosure further provides a device connection method, which is applied to an electronic device. FIG. 4 is a flowchart of a device connection method applied to the electronic device according to an embodiment of the present disclosure. As shown in FIG. 4, the device connection method according to an embodiment of the present disclosure includes following steps.

In step 110, display the information to be scanned.

In an exemplary embodiment, the information to be scanned includes identification information of electronic device. The identification information includes: media access control address.

In step 120, send out a broadcast signal, and establish communication connection with a control terminal in response to that the information to be scanned s scanned by the control terminal.

In an exemplary embodiment, the broadcast signal includes a name and contents. The name of the broadcast signal includes the identification information of the electronic device, and the contents of the broadcast signal include the media access control address of the first Bluetooth equipment.

The electronic device in this embodiment is the electronic device according to any one of the previous embodiments, and implementation principles and implementation effects thereof are similar, which will not be repeated here.

The device connection method according to the embodiment of the disclosure includes: displaying information to be scanned, which includes identification information of the electronic device, and the identification information includes a media access control address; sending out a broadcast signal, establishing communication connection with a control terminal in response to that the information to be scanned is scanned by the control terminal. The broadcast signal includes a name and contents. The name of the broadcast signal includes the identification information of the electronic device, and contents of the broadcast signal include the media access control address of the first Bluetooth equipment. The method according the present disclosure establishes a communication connection with the control terminal based on the Bluetooth communication mode, which can simplify the booting and networking operations of the method, and is convenient for the users.

In an exemplary embodiment, the device connection method further includes: receiving data transmitted from a second Bluetooth equipment of the control terminal, and controlling the operation state of the electronic device according to the data received from the second Bluetooth equipment of the control terminal.

In an exemplary embodiment, the operation state includes at least one of a booting configuration, a networking configuration, and a display state.

In an exemplary embodiment, the display state includes at least one of menu, interface switching, volume adjustment, confirmation, booting or power-off, and standby.

In response to the communication connection between the electronic device and the control terminal, the electronic device controls its own operation state according to the data sent by the control terminal, which can avoid inputting instructions to the electronic device through the matched remote controller when the wireless network is not connected, thereby simplifying the operation and bringing convenience to users.

Figure 5:
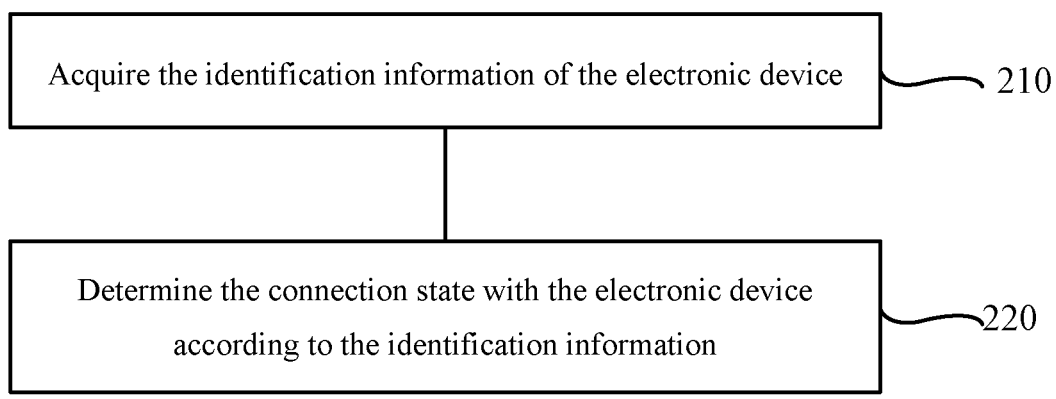
FIG. 5 is a flowchart of a device connection method applied to the control terminal according to an embodiment of the present disclosure.

The embodiment of the disclosure further provides a device connection method, which is applied to a control terminal. FIG. 5 is a flowchart of a device connection method applied to the control terminal according to an embodiment of the present disclosure. As shown in FIG. 5, the device connection method according to an embodiment of the present disclosure includes the following steps.

In Step 210, acquire the identification information of the electronic device.

In an exemplary embodiment, the identification information includes a media access control address.

In step 220, determine the connection state with the electronic device according to the identification information.

In an exemplary embodiment, the connection state includes: communication connection with electronic device is being established and communication connection with electronic device cannot be established.

The control terminal is a control terminal according to any one of the previous embodiments, and they are similar in the realization principle and effect, which will not be described further here.

The device connection method according to the embodiment of the disclosure includes: acquiring identification information of electronic device which includes media access control address; determining the connection state with the electronic device according to the identification information. The control terminal according to the embodiment of the disclosure determines the connection state with the electronic device based on the Bluetooth communication mode, and in the connected state, the booting and networking operations of the electronic device can be simplified, bringing convenience to users.

In an exemplary embodiment, Step 210 includes: scanning the information to be scanned displayed by the electronic device, analyzing the information to be scanned, and obtaining the identification information of the electronic device.

In an exemplary embodiment, the control terminal downloads an application program for controlling electronic device by the control terminal, and scans the information to be scanned through the application program. The application program is bound to the application program server through the identification information of the control terminal, and the application program server may send push notifications to the control terminal. The way to obtain the identification information of electronic device is relatively simple, which can simplify the operation steps of the device connection method.

In an exemplary embodiment, Step 220 includes determining the connection state with the electronic device according to the identification information, including: inquiring about broadcast signals around the control terminal to obtain a list of devices meeting short-distance communication conditions, determining whether the electronic device is in the list of devices according media access control address, and establishing a communication connection with the electronic device when the electronic device is in the list of devices.

In an exemplary embodiment, the short-distance communication condition is that the communication distance with the control terminal is less than a threshold distance, wherein the threshold distance is less than or equal to 15 m.

The mode of establishing communication connection with electronic device may enable the control terminal to be accurately connected to the electronic device with the same identification information obtained by the control terminal, thus avoiding misoperation between the control terminal and other device.

In an exemplary embodiment, the identification information further includes a product model. Step 220 may also include: determining whether the electronic device has Bluetooth communication function according to the product model; when the electronic device has Bluetooth communication function, inquiring about the broadcast signals around the control terminal to obtain a list of devices meeting the short-distance communication conditions. By determining whether the electronic device has the Bluetooth communication function through the product model, avoid the misoperation of establishing a communication connection with the electronic device when the electronic device does not have the Bluetooth communication function, which helps to reduce the power consumption.

Figure 6:
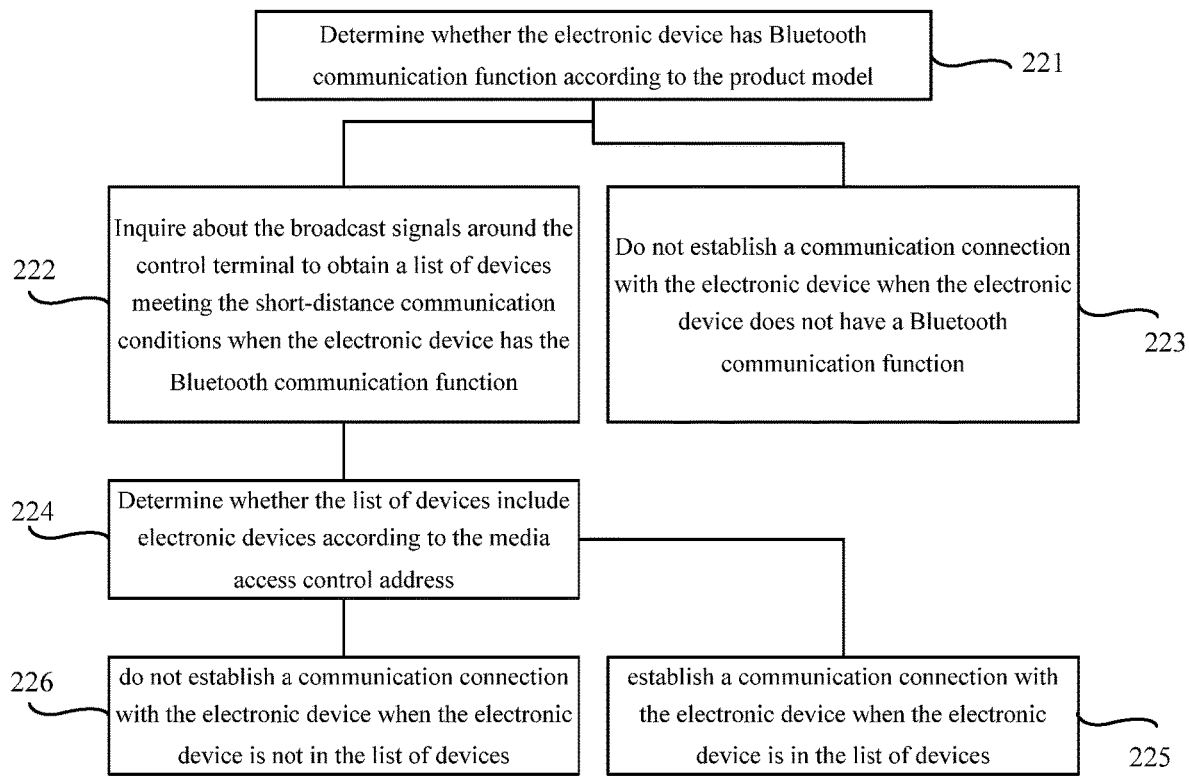
FIG. 6 is a flowchart of Step 220 according to an exemplary embodiment.

In an exemplary embodiment, take as an example that the identification information includes the product model and the media access control address. FIG. 6 is a flowchart of Step 220 according to an exemplary embodiment. As shown in FIG. 6, Step 220 in the device connection method according to an exemplary embodiment includes the following steps.

In step 221, determine whether the electronic device has Bluetooth communication function according to the product model.

In step 222, inquire about the broadcast signals around the control terminal to obtain a list of devices meeting the short-distance communication conditions when the electronic device has the Bluetooth communication function.

In step 223, do not establish a communication connection with the electronic device when the electronic device does not have a Bluetooth communication function.

In step 224, determine whether the list of devices include electronic devices according to the media access control address.

In step 225, establish a communication connection with the electronic device when the electronic device is in the list of devices.

In step 226, do not establish a communication connection with the electronic device when the electronic device is not in the list of devices.

The mode of establishing communication connection with electronic device may enable the control terminal to be accurately connected to the electronic device with the same identification information obtained by the control terminal, thus avoiding misoperation between the control terminal and other device.

In an exemplary embodiment, the device connection method may further include: transmitting booting configuration information and networking configuration information input by the user to a first Bluetooth equipment electronic device in response to establishing a communication connection with the electronic device, so as to perform booting configuration and networking configuration on the electronic device.

Transmitting the configuration information to the electronic device to control the electronic device through the configuration information after the communication connection with the electronic device is established, so that not only the booting and networking operations are simplified, but also other controls on the electronic device can be performed, bringing convenience to users.

In an exemplary embodiment, the device connection method may further include: transmitting instruction information input by a user to a first Bluetooth equipment of the electronic device in response to that the second Bluetooth equipment establishes a communication connection with the electronic device, so as to control the electronic device.

In an exemplary embodiment, the instruction information may include at least one of a menu instruction, an interface switching instruction, a volume adjustment instruction, a confirmation instruction, a booting or a power-off instruction and a standby instruction.

In an exemplary embodiment, instruction information refers to an instruction that can be achieved by a remote controller correspond with the electronic device, that is, the control terminal can achieve the functions of the remote controller corresponding to the electronic device.

Transmitting the instruction information to the electronic device to control the electronic device after the communication connection with the electronic device is established, so that it is not only the booting and networking operations are simplified, but also other controls can be implemented on the electronic device, bringing convenience to users.

Embodiments of the present disclosure further provide a non-transitory computer-readable storage medium, on which a computer program that can be run on a processor is stored, and when the computer program is executed by the processor, the steps of the device connection method applied to the electronic device or the steps of the device connection method applied to the control terminal provided by any of the aforementioned embodiments can be implemented.

Embodiments of the present disclosure further provides an electronic device, which includes a processor and a memory in which a computer program is stored, and when the computer program is executed by the processor, the steps of the device connection method applied to the electronic device or the steps of the device connection method applied to the control terminal provided by any of the foregoing embodiments are implemented.

Those of ordinary skill in the art will understand that all or some of the acts, systems, and functional modules/units in the methods disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on computer readable media, which may include computer storage media (or non-transitory media) and communication media (or transitory media). As is well known to those of ordinary skill in the art, the term "computer storage media" includes volatile and non-volatile, removable and non-removable media implemented in any method or technology for storing information such as computer readable instructions, data structures, program modules or other data. Computer storage media include, but are not limited to, RAM, ROM, EEPROM, flash memory or other memory technologies, CD-ROM, Digital Versatile Disk (DVD) or other optical disk storage, magnetic cassettes, magnetic tapes, magnetic disk storage or other magnetic storage devices, or any other media that may be used to store desired information and may be accessed by a computer. Furthermore, it is well known to those of ordinary skill in the art that communication media typically contain computer readable instructions, data structures, program modules, or other data in a modulated data signal such as a carrier or other transmission mechanism, and may include any information delivery medium.

The drawings in the present disclosure only involve the structures included in the embodiments of the present disclosure, and other structures may refer to common designs.

Although the embodiments disclosed in the present disclosure are as described above, the described contents are only the embodiments for facilitating understanding of the present disclosure, which are not intended to limit the present disclosure. A person skilled in the art to which the present disclosure pertains may make any modifications and variations in the form and details of implementation without departing from the spirit and scope of the present disclosure. Nevertheless, the scope of patent protection of the present disclosure shall still be determined by the scope defined by the appended claims.

What we claim is:

1. An electronic device, comprising: a device body and a first Bluetooth equipment, wherein the device body is connected to the first Bluetooth equipment;
   wherein the device body is configured to display information to be scanned, which comprises identification information of the electronic device, and the identification information comprises a media access control address;
   wherein the first Bluetooth equipment is configured to send out a broadcast signal which comprises a name and contents; the name of the broadcast signal comprises the identification information of the electronic device, and the contents of the broadcast signal comprise the media access control address of the first Bluetooth equipment; the first Bluetooth equipment is further configured to establish a communication connection with a control terminal in response to that the information to be scanned is scanned by the control terminal; and
   wherein the identification information further comprises a product model, which is configured to indicate whether the electronic device has Bluetooth communication function.

2. The electronic device of claim 1, wherein the first Bluetooth equipment is further configured to receive data sent from a second Bluetooth equipment of the control terminal, and
   the device body is further configured to control operation state of the electronic device according to the data received from the second Bluetooth equipment of the control terminal.

3. The electronic device of claim 2, wherein the electronic device further comprises a modulation interface,
   wherein the modulation interface is respectively connected to the first Bluetooth equipment and the device body, and is configured to transmit the data received by the first Bluetooth equipment to the device body.

4. The electronic device of claim 2, wherein the operation state comprises at least one of a booting configuration, a networking configuration and a display state;
the display state comprises at least one of menu, interface switching, volume adjustment, confirmation, booting or power-off, and standby.

5. A device connection method applied to the electronic device of claim 1, the method comprising:
displaying information to be scanned, which comprises identification information of the electronic device, wherein the identification information comprises a media access control address;
sending out a broadcast signal, establishing a communication connection with a control terminal in response to that the information to be scanned is scanned by the control terminal; wherein the broadcast signal comprises: a name and contents; the name of the broadcast signal comprises the identification information of the electronic device, and the contents of the broadcast signal comprise the media access control address of a first Bluetooth equipment.

6. The method of claim 5, wherein the method further comprises:
receiving data sent from a second Bluetooth equipment of the control terminal, and
controlling operation state of the electronic device according to the data received from the second Bluetooth equipment of the control terminal;
wherein the operation state comprises at least one of a booting configuration, a networking configuration and a display state; wherein, the display state comprises at least one of menu, interface switching, volume adjustment, confirmation, booting or power-off, and standby.

7. A non-transitory computer-readable storage medium on which a computer program executable on a processor is stored, and when the computer program is executed by the processor, steps of the device connection method of claim 5 are implemented.

8. A control terminal, comprising a processor and a second Bluetooth equipment; wherein:
the processor is configured to acquire identification information of an electronic device, wherein the identification information comprises a media access control address;
the second Bluetooth equipment is configured to determine a connection state with the electronic device according to the identification information;
the identification information further comprises a product model;
the second Bluetooth equipment is further configured to determine whether the electronic device has Bluetooth communication function according to the product model; in a case that the electronic device has Bluetooth communication function, inquire about the broadcast signals around the control terminal to obtain the list of devices meeting the short-distance communication conditions; and
the processor is configured to scan information to be scanned displayed by the electronic device, analyze the information to be scanned, and obtain the identification information of the electronic device.

9. The control terminal of claim 8, wherein the second Bluetooth equipment is configured to: inquire about broadcast signals around the control terminal to obtain a list of devices meeting short-distance communication conditions, determine whether the electronic device is in the list of devices according to the media access control address, and establish a communication connection with the electronic device when the electronic device is in the list of devices.

10. The control terminal of claim 9, wherein the second Bluetooth equipment is further configured to transmit booting configuration information and networking configuration information input by a user to the first Bluetooth equipment of the electronic device in response to establishing the communication connection with the electronic device, so as to perform booting configuration and networking configuration on the electronic device.

11. The control terminal of claim 9, wherein the second Bluetooth equipment is further configured to transmit instruction information input by a user to the first Bluetooth equipment of the electronic device in response to establishing the communication connection with the electronic device, so as to control the electronic device;
wherein the instruction information comprises at least one of a menu instruction, an interface switching instruction, a volume adjustment instruction, a confirmation instruction, a booting or power-off instruction and a standby instruction.

12. A device connection method, applied to the control terminal of claim 8, the method comprising:
acquiring identification information of the electronic device, wherein the identification information comprises a media access control address;
determining a connection state with the electronic device according to the identification information.

13. The method of claim 12, wherein, obtaining the identification information of the electronic device comprises: scanning the information to be scanned displayed by the electronic device, analyzing the information to be scanned, and obtaining the identification information of the electronic device;
determining the connection state with the electronic device according to the identification comprises: inquiring about broadcast signals around the control terminal to obtain a list of devices meeting short-distance communication conditions, determining whether the electronic device is in the list of devices according to the media access control address, and establishing a communication connection with the electronic device when the electronic device is in the list of devices.

14. The method of claim 13, wherein the identification information comprises a product model;
determining the connection state with the electronic device according to the identification further comprises: determining whether the electronic device has Bluetooth communication function according to the product model; when the electronic device has Bluetooth communication function, inquiring about the broadcast signals around the control terminal to obtain the list of devices meeting the short-distance communication conditions.

15. The method of claim 14, wherein the method further comprises:
transmitting booting configuration information and networking configuration information input by a user to the first Bluetooth equipment of the electronic device in response to establishing the communication connection with the electronic device, so as to perform booting configuration and networking configuration on the electronic device.

16. The method of claim 14, wherein the method further comprises:

transmitting instruction information input by a user to the first Bluetooth equipment of the electronic device in response to establishing the communication connection with the electronic device, so as to control the electronic device;

wherein the instruction information comprises at least one of a menu instruction, an interface switching instruction, a volume adjustment instruction, a confirmation instruction, a booting or power-off instruction and a standby instruction.

17. A non-transitory computer-readable storage medium on which a computer program executable on a processor is stored, and when the computer program is executed by the processor, steps of the device connection method of claim 12 are implemented.

\* \* \* \* \*